3,511,697
METHOD OF APPLYING REACTIVE COATING TO GLASS FIBER
Richard L. Van Auken and Vance A. Chase, Marion, Va., assignors to Brunswick Corporation, a corporation of Delaware
Filed Dec. 6, 1965, Ser. No. 511,867
Int. Cl. C03c 25/00
U.S. Cl. 117—126                    5 Claims

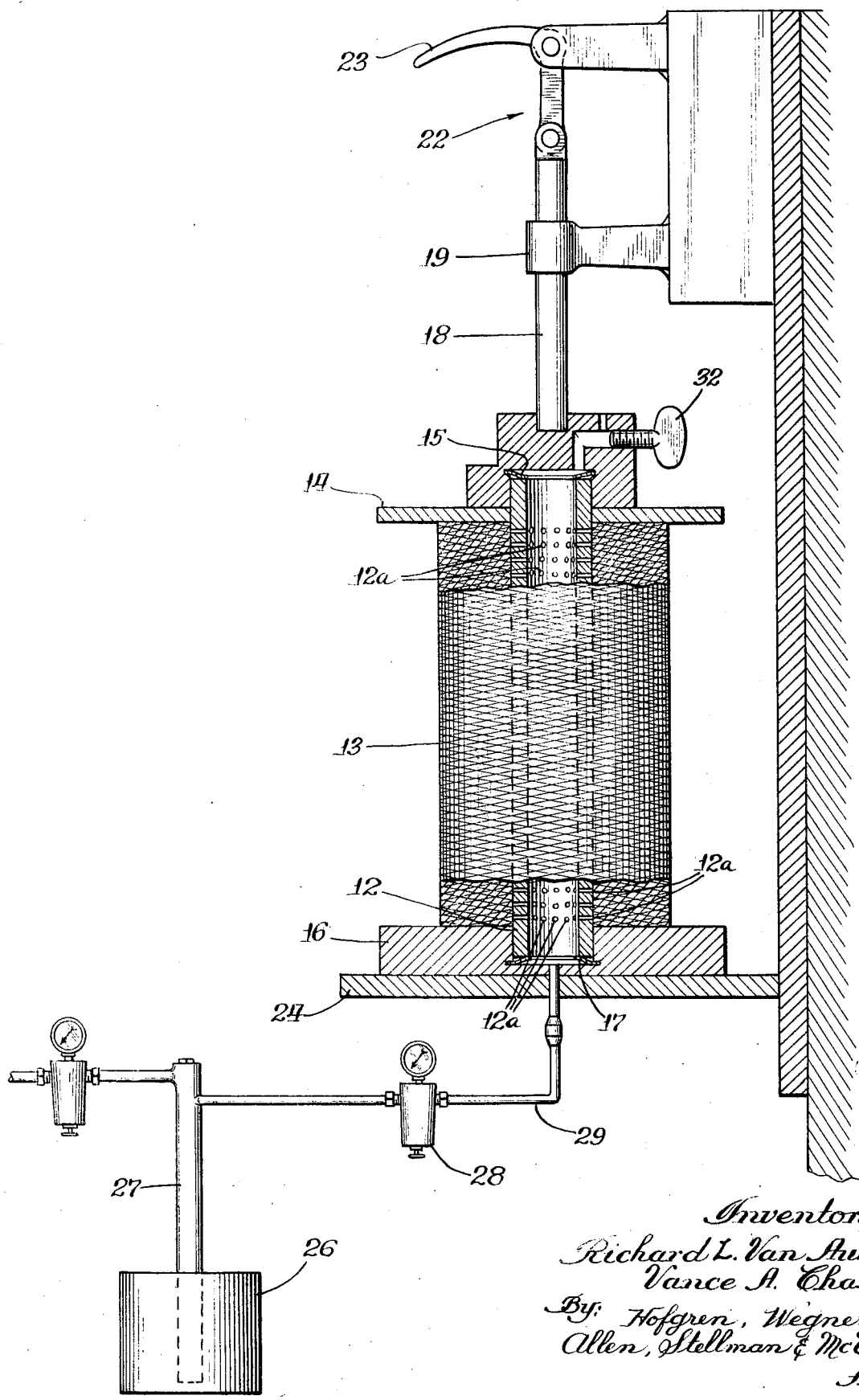

ABSTRACT OF THE DISCLOSURE

A shelf storage stable wound foraminous heat-resistant spool of glass fiber coated with coupling agent which is fixed to the glass fiber surface by reaction therewith and has free reactable functional groups for further reaction with a laminating resin. The wound spool is provided by burning the starch size from a foraminous spool of starch sized glass fiber, saturating the glass fiber with coupling agent by flowing coupling agent through the foraminous perforations in the core, removing excess occluded coupling agent from the spool and heating and drying until the coupling agent reacts with and is fixed to the fiber without material reaction of the groups reactable with the laminating resin. The apparatus for carrying out the method includes a press for sealing the spool ends and a system for injecting fluid into a circular core of the spool and through the foramens under pressure. The wound spool, in combination with the press, forms walls defining a pressurizable chamber for receiving the coupling agent.

---

This invention relates to a method of applying a finish or coupling agent to inorganic or organic fibers for preparing the fibers in a storable form for later use in producing laminated structures of the type including the fiber impregnated with a resin, usually a rigidifying resin. The invention further relates to a method and apparatus for application of a virgin finish, i.e. a pure finish which is not adulterated with a size such as starch, to such fibers and especially to an unfinished strand of fiber glass roving, yarn, fabric, cordage, filament or the like, in a manner in which the fiber glass strand is not materially damaged.

In the manufacture of fiber glass, a size is usually applied to the glass strands or fibers right after they emerge from forming orifices or dies. The primary purpose of the size is to lubricate the glass fibers and prevent them from abrading each other during winding operations or other handling of the fibers. In the absence of the size, fiber abrasion can result in undue weakening of the fiber. The size is usually applied as a liquid or vapor and usually contains water, an emulsifier, a lubricant and a film-forming constituent. For example, in a widely used size, known as a "starch" or "starch-oil" size, the film forming agent is starch, and the lubricant is usually an oil such as a vegetable oil.

The starch-oil sizes are applied primarily to glass rovings which are later to be woven into fabric. The size protects the fibers during such weaving. After the fabric has been woven, the starch or size is usually partially or completely removed by heat cleaning, i.e. volatilizing or burning the size from the fiber, or by treatment of starch-splitting enzymes, or treating with urea solution or chlorine solution followed by heat treatment. The desired finish or coupling agent is then applied.

Where the glass fiber is a filament for use in making windings, e.g. in the form of a roving, the finish or coupling agent is often applied to the glass along with a small percentage of starch-oil size as it emerges from the filament-forming dies. In such case, the size is included for preventing degradation of the filament by abrasion due to the normal winding and handling conditions of fiber glass rovings.

The coupling agent will function to bond a laminating resin to the glass fibers upon impregnation of the fibers with the coupling agent, followed by curing. For this purpose, the coupling agent has one or more chemical groups, e.g. a silane group, which is reactable with the glass, and one or more chemical groups reactable with the laminating resin. For example, the coupling agent may have vinyl or other ethylenically unsaturated groups such as acrylic groups for copolymerization with an ethylenically unsaturated laminating resin; amino, hydroxy, epoxy, ether, vinyl, ester, fumarate, arcrylate or carboxy groups for reaction with a polyester, epoxide, phenolic, melamine, polyimide, and other thermosetting resins. Coupling agents suitable for improving the bond of thermoplastic resins such as polyamide polycarbonate polyethylene, polypropylene, polysulfone, polystyrene, polyacetal and ethylcellulose as well as elastomers may be applied by this method. Selection of proper coupling agents for applying to a glass fiber, depending on the intended resin to be used, is within the skill of the art.

The small amount of starch-oil size contained on a fiber glass filament or a roving prepared from a sized filament adulterates the coupling agent and is detrimental to maximum adhesion between the glass and the laminating resin which is to be applied later. The size is also detrimental to the strength of the composite roving when subjected to high humidity or water immersion environments. The starch content is especially detrimental when the composite is used at elevated temperatures for a long period of time, the starch being less thermally stable than other constituents of the composite.

It is a general object of this invention to provide a new and useful method and apparatus for applying a coupling agent to organic or inorganic fibers, such as glass fibers.

Yet another object of this invention is to provide a supply of fiber glass strand or other fiber coated with a coupling agent which can be stored and later used directly in laminating procedures, i.e. can be directly wound on a form so that the laminating resin can be applied immediately and cured.

Still another object of this invention is to provide a new and useful method and apparatus which can be used to coat a mass or supply of glass fiber strand with a coupling agent to provide a storable supply of the coated glass fiber strand.

Other objects will be apparent from the following description and the drawings, in which the figure is a diagrammatic illustration of an apparatus for use in applying a laminating resin or coupling agent to the fiber glass strand.

While this invention is susceptible of embodiment in many different forms, there is shown in the drawing and will herein be described in detail a specific embodiment of the invention with the understanding that the present disclosure is to be considered as an exemplification of the principles of the invention and is not intended to limit the invention to the embodiment illustrated.

In the present invention, a sized glass fiber strand, e.g. in the form of yarn, roving, fabric, cordage, filament or the like, is formed into a storable shape or form, e.g. wound on a porous or foraminous core such as a hollow spool having a perforated wall. The fiber is then cleaned for removal of size and is coated with a fluid virgin coupling agent in situ on the core to provide a storable supply of fiber glass. Many coupling agents are available commercially, e.g. those given above, and a suitable fluid coupling agent, either normally liquid or normally gaseous or vaporous, can be selected, following advisement of the manufacturer, for any of a variety of laminating resins which may later be applied to the coated glass fiber material.

The coating is effected by pressure impregnation of the glass fiber, advantageously from within the porous core, with a solution of virgin or unadulterated coupling agent. The impregnation is usually such as to saturate the glass fiber form and entrapper or occluded excess coupling agent is then removed from the fiber, e.g. by gravity drawing. The solvent, e.g. water, ethanol, etc., is sufficiently volatile to be readily removed at an elevated temperature to leave the virgin or unadulterated coupling agent as a coating on the fiber. The coupling agent is now fixed on the fiber glass by drying at an elevated temperature, volatilizing the solvent. The coating on the fiber is stable and can be stored for an indefinite period of time. The stored fiber can be used at a later time in forming layups for producing a laminated structure.

The drying temperature is sufficient to react the glass-reacting, e.g. silane, groups with the surface glass of the fiber glass strands. Drying is advantageously carried out below the boiling point of water under slight vacuum sufficient to draw off moisture, for a time sufficient to react the coupling agent with the glass and dry the resulting adhering layer of coupling agent. The dried layer of coupling agent, in addition to functioning to couple a laminating resin to the fiber glass, is capable of functioning to provide protection from abrasion damage during winding or other handling of the fiber glass.

According to a preferred procedure, referring to the drawings, a fiber glass strand having a size, e.g. a starch size coating, containing about 1.5 to about 2% by weight size based on weight of the fiber glass, is wound as windings 13, e.g. by a conventional helical spool wind, on a hollow spool 12 having a foraminous wall with uniform perforations 12a placed in areas where fiber glass wound on a spool contacts the spool. For this purpose, such a spool can be supplied to the manufacturer for use in lieu of the conventional spool normally used by the manufacturer. The entire spool with fiber glass thereon is subjected to a cleaning operation in which the size is removed down to a content less than .1% by weight based on the fiber weight, e.g. by heating the glass at about 500–600° F. for about 50 to 60 hours. The spool is then placed in a pressure impregnating device for forcing virgin coupling agent under pressure through the spool of fiber glass.

The system illustrated in the drawing is designed for use with a liquid coupling agent for coating a glass fiber filament. There is provided a cap member 14 having a receptacle for receiving a top portion of the hollow spool 12 extending beyond winding 13, cap 14 has a top seal or gasket 15 for peripherally sealing the end of the spool. A base member 16 is also provided and similarly has a receptacle for receiving an extending bottom portion of the spool 12 and includes a bottom seal or gasket 17 for peripherally sealing the bottom projection of the spool. Gaskets 15 and 17 have central openings to permit the free passage of coupling agent therethrough into and from the interior of the spool 12, but seal the end edges of the spool to prevent leakage therefrom.

Base member 16 is supported on a bottom plate 24 of a press. The press includes a ram plunger 18 slidably mounted by bracket 19 and operable through linkage 22 by handle 23. The press is of conventional design and, when the spool 12 is inserted between the top member 14 and base member 16, as in the position illustrated in the drawing, handle 23 can be moved in one direction to press the spool between the top and base members and seal the ends of the spool, except for their communication through the centers of gaskets 15 and 17. Handle 23 is movable in the other direction for releasing the press so that the spool can be removed from between top member 14 and base member 16. Before inserting the spool of cleaned fiber, it is preferred that the outer surfaces of the windings be coated with an application of the coupling resin solution.

The spool is placed between the top and base members 14 and 16 and the press is operated to seal the spool ends. Tank 26 contains a supply of normally liquid virgin coupling agent. An air pump 27 is provided for pumping coupling agent from tank 26 through a regulator valve 28 and line 29. Regulator valve 28 is set at a pressure sufficient to impregnate the fiber glass on spool 12 with coupling agent. Line 29 projects through bottom plate 24 and is connected to the base member 16 to communicate through the center of gasket 17 with the interior of spool 12.

The core or spool is allowed to fill and overflow with coupling agent through valved port 32 in the top member 14. While overflow occurs, the valved port 32 is closed and the solution, under pressure, is thereupon forced through the perforations 12a and into the windings on spool 12. When the roving is thoroughly wet, some excess solution is usually allowed to flush through; and, when saturation of the fiber glass surface is complete, the pressure is released, e.g. by stopping and/or venting air pump 27 and by opening valved port 32. Handle 23 is moved to release the press and the spool is removed from between top member 14 and base member 16 and permitted to drain.

The coated fiber glass filament can be unwound from the spool, laid upon a mold form, impregnated with laminating resin reactable with the coupling agent groups, and reacted with the laminating resin under normal curing conditions to form a more optimum fiber glass reinforced structure.

As a specific example, a ten pound wound foraminous spool of starch sized glass fiber (1.5 to 2% size) was heated in an oven at 590° for 72 hours, permitted to cool, coated with gamma-aminopropyltriethoxysilane, a coupling agent, on the exposed glass fiber surfaces and then placed in the device illustrated in the drawings, as described above. Tank 26 was filled with gamma-aminopropyltriethoxysilane and regulator valve 28 was set at 15 p.s.i.a. Pump 27, operating at 40 p.s.i.a., was started and upon overflow of coupling agent through valved port 32, valved port 32 was closed. After about ten minutes, pump 27 was stopped and valved port 32 was opened. The spool was then removed from the press and permitted to drain. The spool was then placed in a vacuum oven and dried at a slight vacuum for removal of moisture and at a temperature about 10 degrees below the boiling point of water at the operating pressure, for 12 hours. The amino group of the coupling agent is available for reaction with reactive groups of a laminating resin, e.g. an epoxide, for preparing a rigid laminate structure or the like.

Although gamma-aminopropyltriethoxysilane was used as the coupling agent in the above example, the particular coupling agent selected is not critical to this invention and other coupling agents are equally useful, including, but not limited to, vinyl-tris(beta methoxyethoxy)silane, gamma-methacryloxypropyltrimethoxysilane, N,N-bis(beta-hydroxyethyl)-gamma-aminopropyltriethoxysilane, beta(3,4-epoxycyclohexyl) ethyltrimethoxysilane, and gamma-glycidoxypropyltrimethoxysilane. Still other useful coupling agents are well known to those in the art.

The concentration of the coupling agent in the solution, i.e. amount of coupling agent in the solvent, can be adjusted or controlled to provide a predetermined total amount or average thickness of coupling agent on the fiber. In correlating concentration of solution with the amount or thickness of coupling agent desired to be deposited on the fiber, lower concentrations of the solution result in decreased amount of coupling agent on the fiber, while higher concentrations result in greater amounts of coupling agent on the fiber. With only simple experimentation it is possible to determine the precise concentration of solution required for depositing a particular desired amount or thickness of the coupling agent.

The foraminous hollow spool may be of metal such as aluminum, paper board, composition or the like. If problems are incurred with discoloration of the glass fiber and coupling agent coating where aluminum spools are used, it is preferred to anodize or otherwise coat the spools. All percents given herein are percents by weight unless otherwise indicated.

We claim:

1. A method of producing a supply of fiberglass having a reactive coating, which comprises providing a strand of a starch size coated glass fiber filament having a substantial amount of the starch size on its surface and wound on a perforated hollow heat-resistant core spool; heat cleaning the winding on the spool by heating the resulting spool of fiber at a starch burn-off temperature of about 500 to 600° F. for a time sufficient to reduce the weight of the size coating to a non-lubricating level below about 0.1% by weight based on the glass fiber; saturating the spool of glass fiber with a liquid solution of reactive coating material having free reactive functional groups, said solution having a concentration of said coating material correlated with the desired amount of such material to be coated on the fibers, by applying a liquid composition of said coating material with pressure through the hollow core perforations and wound glass filament on the spool until the glass fiber is completely coated with the liquid solution, recovering the spool of coated glass fiber; removing occluded liquid from the spool of fiber; and drying the liquid solution coating at reduced pressure with sufficient heat to remove solvent from the coating composition while keeping the free reactive functional groups nonreacted and until the composition is fixed to the glass fiber.

2. The method of claim 1 wherein said coupling agent is a silane coupling agent including a free functional group for co-reaction with a curing laminating resin, and said drying step comprises drying until the coupling agent is fixed to the fibers with said free functional group unreacted.

3. The method of claim 2 wherein said free functional group is selected from the class consisting of amine, hydroxy, carboxy, glycidoxy, epoxy, ether, ester, and groups containing ethylenical unsaturation.

4. The method of claim 1 wherein said saturating step comprises providing end plates on said spool for defining with said spool a pressurizable chamber having an inlet for introducing a fluid and an outlet, placing the spool of glass fiber in said chamber with the interior of the spool sealed in communication with said inlet and outlet, respectively, at the opposing open ends of the spool, charging fluid unadulterated coupling agent into said inlet under pressure with said outlet open for flowing the fluid coupling agent through the hollow core and perforations of said spool and through the wound glass filament on said spool until the glass fiber is completely saturated with coupling agent, closing said outlet whereby said chamber becomes pressurized by said charging step, opening said outlet and terminating said charging step to depressurize said chamber, recovering the saturated spool of glass fiber from said chamber and removing occluded coupling agent from said spool of glass fiber leaving a coating of coupling agent on the glass fiber; and said drying step comprises drying the resulting spool of coated glass fiber at a temperature below the boiling point of water until the coupling agent is fixed to the glass fiber, whereby a dried coupling agent coating having unlimited shelf life is formed on the glass fiber.

5. A method of producing a shelf stable supply of finished glass fiber, which method comprises winding a strand of a starch size coated glass fiber filament, having from about 1.5 to about 2% by weight of the size coating based on weight of the fiber, in a standard wind pattern on a heat resistant perforated hollow core spool heat cleaning the glass fiber on the spool by heating the resulting spool of fiber at a temperature in the range of about 500 to 600° F. for a time sufficient to reduce the weight of the size coating below about 0.1% by weight based on the glass fiber; saturating the fiber winding with coupling agent having a functional group reactable with the glass surface and free functional groups for reaction with a laminating resin by (1) placing the spool of glass fiber in a container, applying a liquid solution of coupling agent having a concentration of coupling agent correlated with the desired amount of coupling agent to be coated on the fibers from the interior of the spool through the hollow care and perforations of said spool and the wound glass filament on said spool and into the container until the glass fiber winding is fully coated and completely saturated with coupling agent, said coupling agent having an active silane group for reaction with the fiber glass surface and a free functional group selected from the class consisting of amine, hydroxy, carboxy, glycidoxy, epoxy, ether, ester, and groups having ethylenical unsaturation, recovering the saturated spool of glass fiber from the container; and removing excess occuluded coupling agent by draining occluded coupling agent from said spool of fiber; and heating and drying by oven drying the spool of fiber at lower than atmospheric pressure and at a temperature below the boiling point of water until the coupling agent is fixed to the glass fiber while retaining free functional groups for reaction with the laminating resin.

References Cited

UNITED STATES PATENTS

| 2,946,698 | 7/1960 | Brunnick et al. | 117—54 |
| 3,231,540 | 1/1966 | Vanderbilt. | |
| 3,322,566 | 5/1967 | Bright. | |
| 3,369,926 | 2/1968 | Eakins. | |
| 3,032,434 | 5/1962 | Archibald. | |

DAVID KLEIN, Primary Examiner

U.S. Cl. X.R.

117—46